(12) United States Patent
Moldoch et al.

(10) Patent No.: US 11,417,992 B2
(45) Date of Patent: Aug. 16, 2022

(54) MODULAR EDGE PATCHING SYSTEM

(71) Applicant: Ortronics, Inc., New London, CT (US)

(72) Inventors: Michael J. Moldoch, Colchester, CT (US); Jason Finnegan, Wallingford, CT (US); Yann Morvan, Clinton, CT (US); Kenneth A. Cupples, New London, CT (US); Dylan Petruskevicius, Willimantic, CT (US); Frank B. Ruotolo, Clinton, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 16/898,043

(22) Filed: Jun. 10, 2020

(65) Prior Publication Data

US 2020/0395719 A1 Dec. 17, 2020

Related U.S. Application Data

(60) Provisional application No. 62/860,292, filed on Jun. 12, 2019.

(51) Int. Cl.
*H01R 13/73* (2006.01)
*H01R 13/518* (2006.01)
*H04Q 1/02* (2006.01)

(52) U.S. Cl.
CPC ............ *H01R 13/73* (2013.01); *H01R 13/518* (2013.01); *H04Q 1/13* (2013.01)

(58) Field of Classification Search
CPC .............................. H01R 13/518; H01R 13/73
See application file for complete search history.

(56) References Cited

U.S. PATENT DOCUMENTS

| | | | |
|---|---|---|---|
| 4,630,886 A | 12/1986 | Lauriello et al. | |
| 4,824,196 A | 4/1989 | Bylander | |
| 4,995,688 A | 2/1991 | Anton et al. | |
| 5,011,257 A | 4/1991 | Wettengel et al. | |
| 5,129,842 A | 7/1992 | Morgan et al. | |
| RE34,955 E | 5/1995 | Anton et al. | |
| 5,530,954 A | 6/1996 | Larson et al. | |
| 5,788,087 A | 8/1998 | Orlando | |
| 5,903,698 A | 5/1999 | Poremba et al. | |
| 6,293,707 B1 | 9/2001 | Wild | |
| RE37,489 E | 1/2002 | Anton et al. | |
| 6,537,106 B1 | 3/2003 | Follingstad | |
| 6,600,106 B2 | 7/2003 | Standish et al. | |
| 6,846,200 B1 * | 1/2005 | Hsu ...................... | H01R 13/659 439/540.1 |
| 6,866,541 B2 | 3/2005 | Barker et al. | |
| 6,901,200 B2 | 5/2005 | Schray | |
| 7,070,459 B2 | 7/2006 | Denovich et al. | |

(Continued)

OTHER PUBLICATIONS www.panduit.com/products <http://www.panduit.com/products>, Panduit Product Information, Copyright 1995-2003, 2 pages.

(Continued)

*Primary Examiner* — Jean F Duverne
(74) *Attorney, Agent, or Firm* — McCarter & English, LLP

(57) ABSTRACT

The disclosed angled modular edge patching system is configured to be mounted to a ceiling, furniture or wall, facilitate cable management functions and enhance space utilization. The disclosed angled modular edge patching system including a patch panel element and a base, which are configured to be releasably engaged.

19 Claims, 7 Drawing Sheets

(56) References Cited

U.S. PATENT DOCUMENTS

| 7,094,095 | B1 | 8/2006 | Caveney |
| 7,207,835 | B2 | 4/2007 | Levesque et al. |
| 7,962,000 | B2 * | 6/2011 | Wagner .................. H04Q 1/13 385/135 |
| 2003/0022552 | A1 | 1/2003 | Barker et al. |
| 2004/0209515 | A1 | 10/2004 | Caveney et al. |
| 2006/0093301 | A1 * | 5/2006 | Zimmel ............... G02B 6/4471 385/135 |
| 2006/0171075 | A1 | 8/2006 | Caveney et al. |
| 2006/0194470 | A1 | 8/2006 | Caveney |
| 2009/0163043 | A1 | 6/2009 | Demers et al. |
| 2010/0135633 | A1 | 6/2010 | Wagner et al. |

OTHER PUBLICATIONS

Ortronics product literature, The Complete Guide to Structured Cabling Systems, 1999, 2 pages.
Ortronics product literature, 1997-98 Full Line System Solutions Catalog, 2 pages.
NORDX/CDT brochure entitled "IBDN Enhanced Connectivity," 4 pages, dated 1997.
Panduit® catalog, front cover page, pp. 5, 7, 8, 19, 59 through 67, and back cover page, dated 1996.
1996 Anixter catalog, front cover, pp. 1-6, 1-7, 1-20 through 1-24, 1-47, 1-48a, 1-49, 1-51, 1-80a, 1-129, 1-138, 1-161, 1-184, and back cover page, dated 1996.
The Siemon Company Catalog 1997, front cover page, pp. 2-1 through 2-9,, 2-18, 2-19, 14-6, and back cover page, dated 1997.
1997 Nordx/CDT catalog entitled "IBDN Catalog and Reference Guide," front cover page, pp. 5-21 through 5-29, and back cover page, Oct. 1996.
Extended European Search Report from related European Patent Application No. 20179638.0 dated Oct. 22, 2020.

* cited by examiner

MODULAR EDGE PATCHING SYSTEM

CROSS-REFERENCE TO RELATED APPLICATION

The present application claims priority benefit to a U.S. provisional application entitled "Modular Edge Patching System," which was filed on Jun. 12, 2019 and assigned Ser. No. 62/860,292. Applicant incorporates herein by reference the content of the foregoing provisional patent application. The present application is related to a commonly assigned U.S. patent entitled "Angled Patch Panel Assembly," which issued on Apr. 24, 2007, as U.S. Pat. No. 7,207,835. The entire content of the foregoing patent is incorporated herein by reference.

TECHNICAL FIELD

Embodiments of the disclosure relate to an advantageous modular edge patching system and, more particularly, to an angled modular edge patching system that is configured to be mounted relative to a ceiling, furniture or wall, facilitate cable management functions and enhance space utilization.

BACKGROUND

Patch panels are well known in the field of data communication systems. A patch panel generally provides a plurality of network ports incorporated into a single structural element that connect incoming and outgoing lines of a local area network (LAN) or other communication, electronic or electrical system. Patch panels are usually housed within a telecommunications closet or in an alternative location appropriate for patching cables. Typical patch panels are mounted hardware units that include a plurality of port locations (e.g., twenty four or forty eight) that function as a sort of static switchboard, using cables to interconnect computers associated with a LAN and/or to connect computers to an outside network, e.g., for connection to the Internet or other wide area network (WAN). A patch panel generally uses a sort of jumper cable, called a patch cord, to create each interconnection.

In a typical installation, the patch panel connects a network's computers to each other and to the outside lines that enable the LAN to connect to the Internet or another WAN. Connections are generally made with patch cords and the patch panel allows circuits to be easily and efficiently arranged and rearranged by plugging and unplugging the patch cords. Patch panel systems are generally intended to facilitate organization and management in implementing telecommunications wiring systems, e.g., for high speed data networks.

Patch panels are routinely mounted between rack elements so as to permit wires or cables, e.g., unshielded twisted pair (UTP) cables, to be wired to IDCs positioned at the rear face of the patch panel, and to further permit patch plugs to be plugged into jacks or ports positioned in the front face of the patch panel. Typical patch panels are substantially planar, extending horizontally from rack element to rack element. Wires/cables are routed to the desired location at the rear of the patch panel, i.e., in the bounded region defined by spaced rack elements. Patch cords are routed to the desired jack/port on the front face of the patch panel, e.g., from a raceway or the like. Thus, for cable management purposes, the patch cords are generally drawn toward one or the other side of the patch panel at the front of the rack system and, from there, routed to the desired component and/or network communication location.

Despite efforts to date, a need remains for improved angular modular edge patching system that is configured to be mounted to a ceiling, furniture or wall, facilitate cable management functions and enhance space utilization.

SUMMARY

The present disclosure is directed to a modular edge patching system (e.g., angled modular edge patching system) that may be configured to be mounted to a ceiling, furniture or wall. As used throughout, "modular edge patching system" may be used interchangeably with "modular patch panel", "patch panel", "edge patching system" or "patching system". According to the present disclosure, the disclosed modular patch panel may be configured to facilitate cable management functions and enhance space utilization.

The disclosed modular patch panel may include features/elements configured, in part, to directly/indirectly mount to a ceiling, furniture or wall. The disclosed modular patch panel may be configured to interface with at least one connector (and cable). In embodiments of the disclosure, "furniture" may refer to a desk, rack, console, shelf, table, chair, bookshelf, and similar structures thereof.

In an exemplary embodiment, a modular patch panel assembly may include a patch panel element, which further includes a first surface and two opposing sidewalls defining an interior and an exterior, and at least one opening configured to receive at least one connector; and a base, which further includes a second surface and two opposing sidewalls defining an interior and an exterior, and a protuberance extending outwardly from each of the sidewalls and including an engagement feature, wherein the patch panel may be releasably engaged with the engagement features of the protuberances such that the first surface and the second surface at least partially define the exterior. The patch panel element may be slidably engaged with respect to the base. In some instances, the patch panel element may be configured to receive six linearly aligned connectors. The protuberances of the base may be partially angled with respect to each other. The angled protuberances may assist in mounting a first modular patch panel assembly in close proximity to an adjacent modular patch panel assembly. In some instances, at least two modular patch panel assemblies may engage with a plate. The plate may be configured to engage with a ceiling, furniture or wall.

Additional advantageous features, structures and functions associated with the present disclosure will be apparent from the detailed description which follows, particularly when read in conjunction with the accompanying figures.

DETAILED DESCRIPTION

Figure 1A:
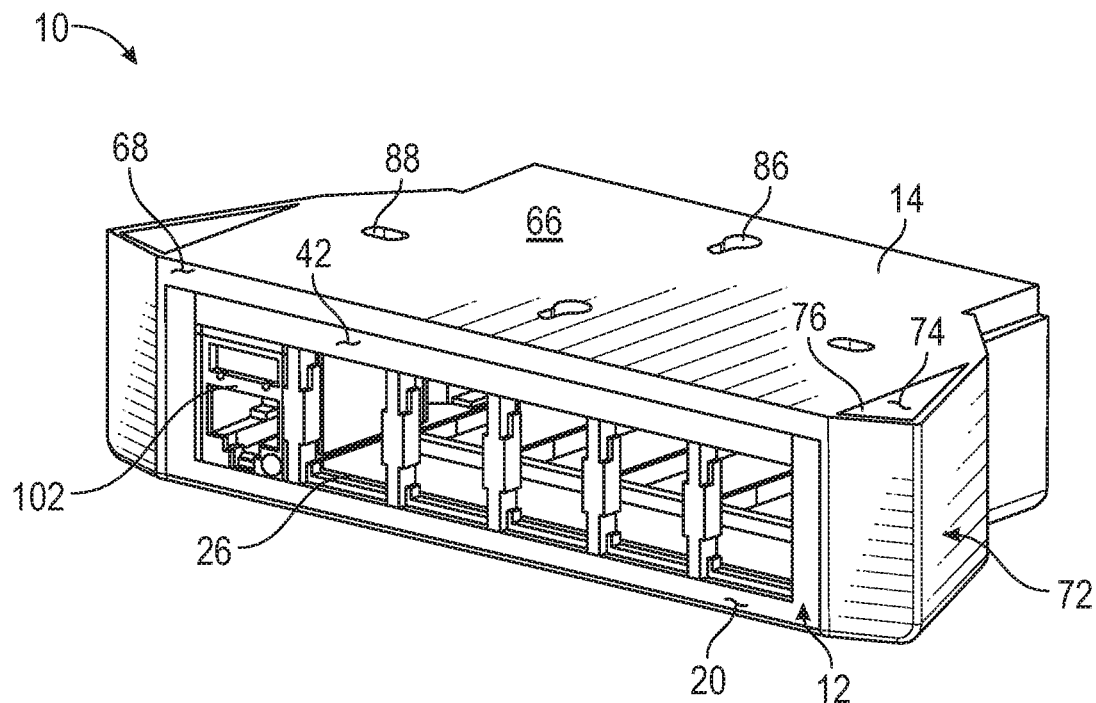
FIG. 1A schematically depicts a perspective view of a modular patch panel assembly according to this disclosure.

In the following description, it is understood that terms such as "top," "bottom," "outward," "inward," "internal," "external," "front," "back," "side," and the like are words of convenience and are not to be construed as limiting terms. Reference will now be made in detail to exemplary embodiments of the disclosure, which are illustrated in the accompanying figures and examples. Referring to the drawings in general, it will be understood that the illustrations are for the purpose of describing particular embodiments of the disclosure and are not intended to limit the same.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

According to the present disclosure, the disclosed modular patch panel may be configured to be mounted to a ceiling, furniture or wall, facilitate cable management functions and enhance space utilization.

Referring now to the drawings, like parts are marked throughout the specification and drawings with the same reference numerals, respectively. Drawing figures are not necessarily to scale and in certain views, parts may have been exaggerated for purposes of clarity.

As depicted in FIGS. 1A-2C, modular patch panel 10 may include patch panel element 12 and base 14. Patch panel element 12 may be configured to movably engage with base 14. Patch panel element 12 may be configured to releasably engage with base 12 (e.g., semi-permanent engagement). Base 14 may be configured to directly/indirectly engage with at least one surface of the disclosed ceiling, furniture or wall. Base 14 may be first mounted directly/indirectly with respect to at least one surface of the disclosed ceiling, furniture or wall and patch panel element 12 may be secondly mounted with respect to base 14. However, it should be appreciated that patch panel element 12 may be mounted with respect to base 14 at the same time as or before mounting base 12 directly/indirectly with respect to at least one surface of the disclosed ceiling, furniture or wall.

Patch panel element 12 may include first surface 16 (e.g., top or bottom surface) and at least one sidewall 18, which, in part, define an interior and an exterior. In some instances, patch panel element 12 may include first surface 16 and two oppositely positioned sidewalls 18 extending therefrom. Two oppositely positioned sidewalls 18 may be substantially parallel, in part, and may be angled, in part, with respect to each other. Sidewalls 18 may include features that promote releasable engagement with base 14. Patch panel element 12 may further include one or more additional sidewalls adjacently positioned with respect to the two oppositely positioned sidewalls 18. For example, patch panel element 12 may further include oppositely positioned front face 20 and back face 22 extending therefrom and angularly positioned with respect to sidewalls 18, such as perpendicular to or substantially perpendicular to sidewalls 18. Thus, first surface 16, sidewalls 18, front face 20 and back face 22 may, in whole or in part, define an interior and an exterior. Sidewalls 18 may be configured to, in part, releasably engage with base 14.

Front face 20 and back face 22 may be positioned parallel to or angled with respect to each other. Patch panel element 12 may be configured to directly/indirectly interface with at least one of a connector (e.g., jack or plug) and a cable. Front face 20 and/or back face 22 may be configured to directly/indirectly interface with at least one of a connector (e.g., jack or plug) and a cable. For example, front face 20 may include features/elements for directly/indirectly interfacing with at least one of a connector (e.g., jack or plug) and a cable. In some embodiments, front face 20 may be configured to interface with one or more connectors, such as a connector for power, signal and/or control applications. Connector may be releasably engaged with front face 20 and/or back face 22. It should be appreciated that depending on the connector, the features/elements required to engage with such connector may be different. Therefore, any discussion of features/elements designed to interface with a specific connector type/design is non-limiting and merely for ease of discussion, unless otherwise stated. In some instances, patch panel element 12 may include two or more different connector types/designs.

In some embodiments, front face 20 may define at least one opening configured to releasably engage with at least one connector. In an exemplary embodiment, front face 20 may define a plurality of openings, each configured to releasably engage with at least one connector. For example, six linearly aligned openings, each configured to releasably engage with at least one connector. However, more or less linearly aligned openings may be incorporated without departing from the spirit/scope of this disclosure. In fact, the number of openings may be determined based on the desired form factor of modular patch panel 10. Front face 20 may further include at least one additional row of linearly aligned openings. The at least one additional row of linearly aligned openings may be aligned with, offset from or partially aligned with and partially offset from the first row of linearly aligned openings.

Figure 4:
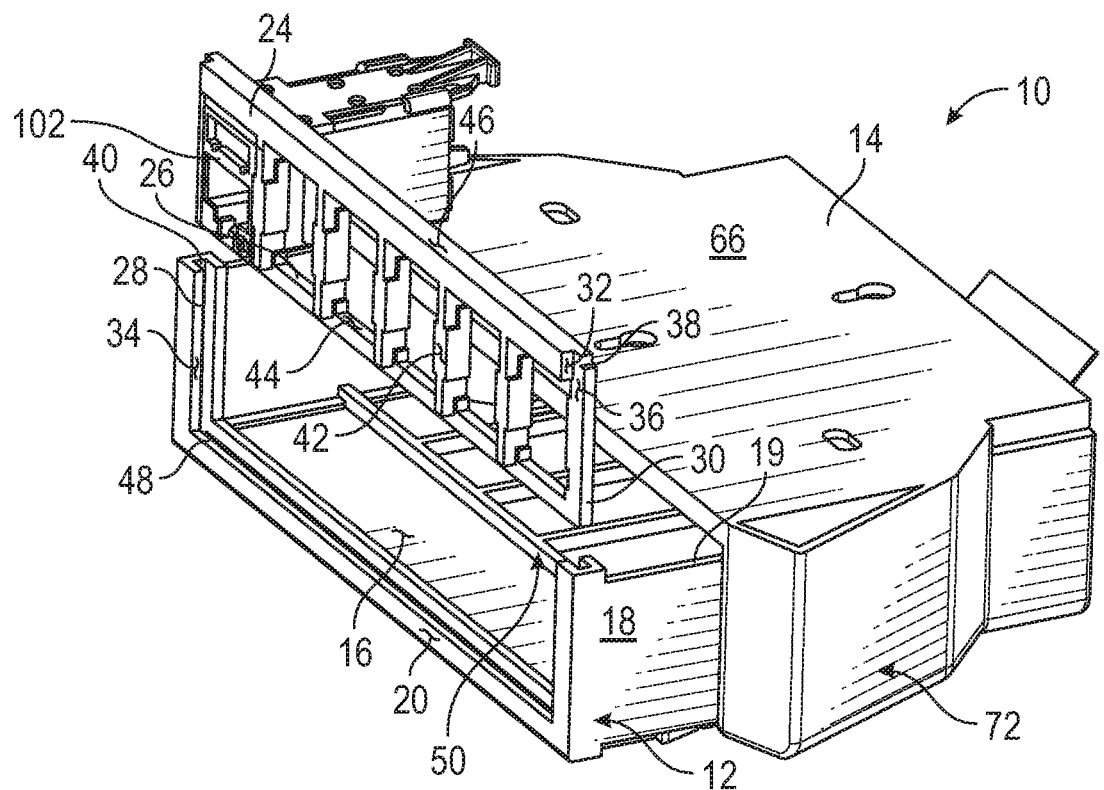
FIG. 4 schematically depicts a top perspective view of an unassembled modular patch panel assembly including a patch panel element, a connector plate and a base, according to this disclosure.
Figure 5A:
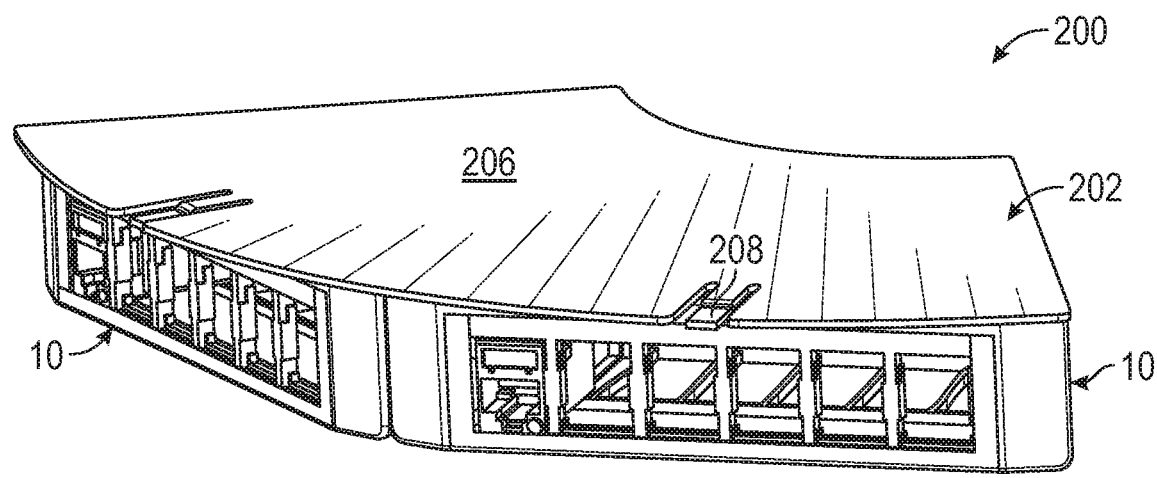
FIG. 5A schematically depicts a top perspective view of an assembled modular patch panel assembly including a plate according to this disclosure.
Figure 5B:
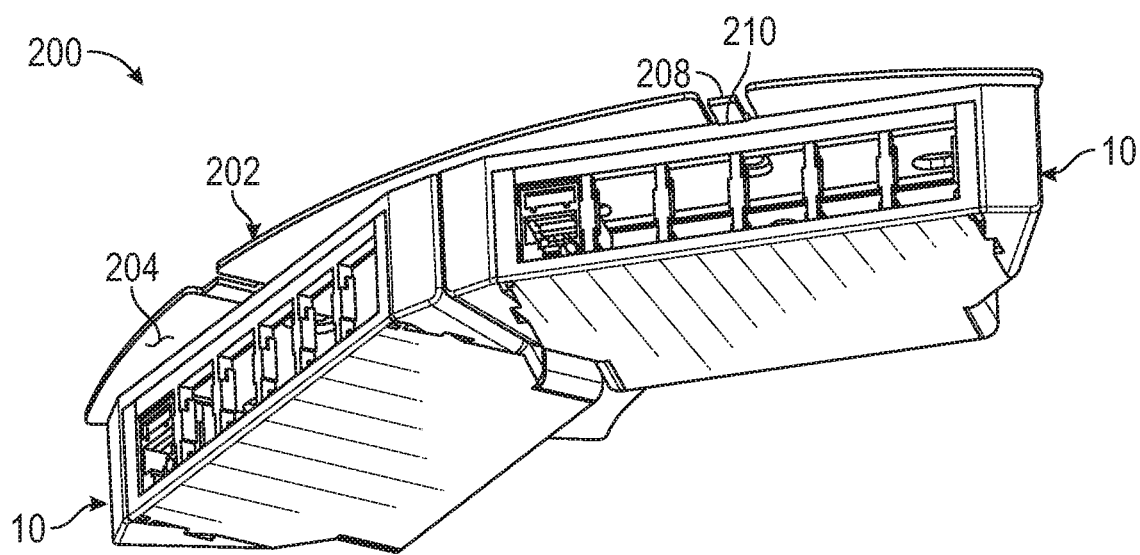
FIG. 5B schematically depicts a bottom perspective view of an assembled modular patch panel assembly including a plate according to this disclosure.
Figure 6:
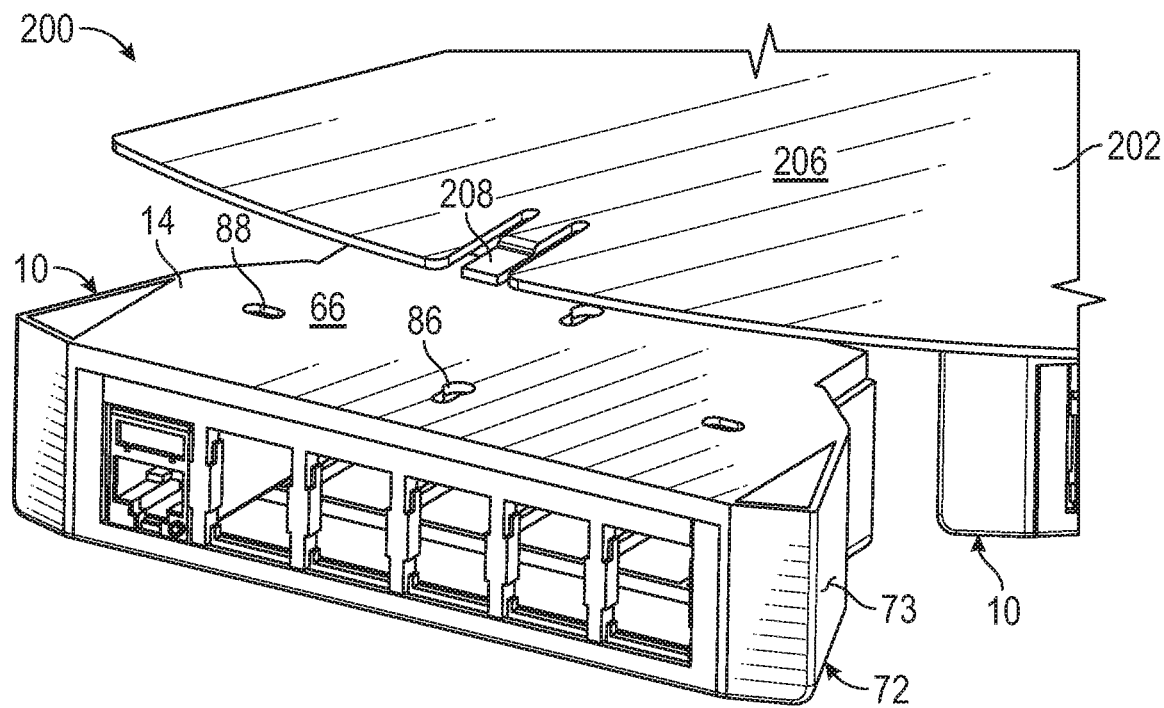
FIG. 6 schematically depicts a top perspective view of an unassembled modular patch panel assembly including a plate according to this disclosure.
Figure 7:
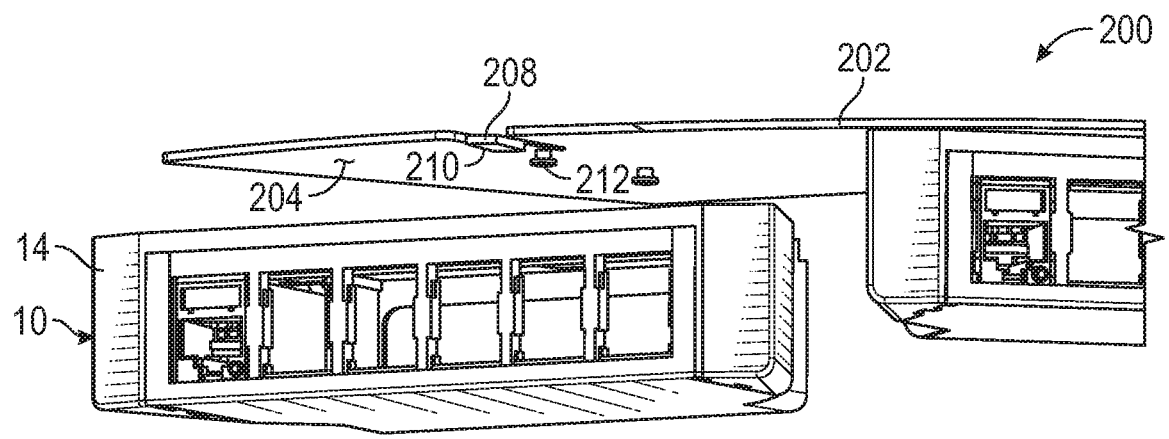
FIG. 7 schematically depicts a perspective view of an unassembled modular patch panel assembly including a plate according to this disclosure.
Figure 8A:
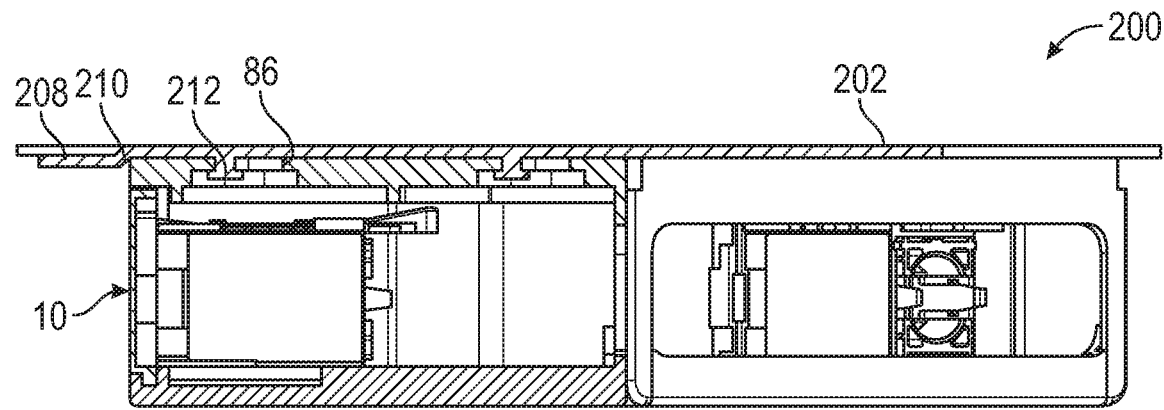
FIG. 8A schematically depicts a side section view of an assembled modular patch panel assembly including a plate according to this disclosure.
Figure 8B:
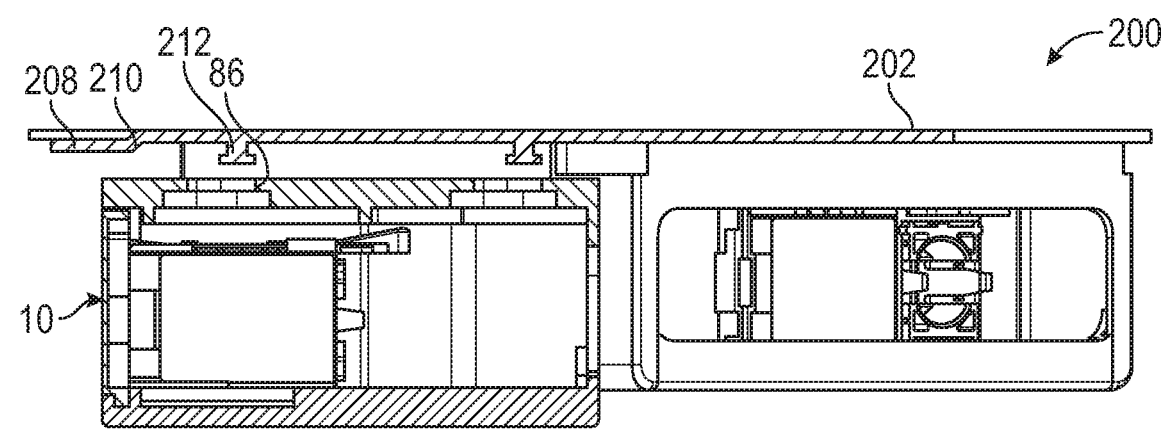
FIG. 8B schematically depicts a side section view of an unassembled modular patch panel assembly including a plate according to this disclosure.

In an exemplary embodiment, as depicted in FIG. 4, patch panel element 12 may further include connector plate 24 defining at least one opening 26 configured to releasably engage with at least one connector 102 (e.g., jack or plug). Opening 26 may define a bottom opening surface 44 which may at least partially engage with connector 102. Bottom surface 44 may be substantially planar with surface 48 of patch panel element 12. However, it is appreciated that surface 48 may be positioned above or below bottom surface 44. Connector plate 24 may define a top surface 46 and first front surface 42. Connector plate 24 may be fixedly engaged with patch panel element 12 or may be configured to releasably engage with patch panel element 12. In some instances, first front surface 42 of connector plate 24 may be substantially planar with front face 20 of patch panel element 12. Connector plate 24 may further define top surface 46, which may be configured to at least partially interface with base 14, as discussed below.

In some embodiments, patch panel element 12 may define a feature configured to directly/indirectly engage with one or more features of connector plate 24. In particular, connector plate 24 may be configured to slidably engage with slot 28 (e.g., U channel) of patch panel element 12. Connector plate 24 may define sidewalls 30 configured to releasably engage with U channel 28 of patch panel element 12. Sidewalls 30 may define second front surface 36 which may be configured to be received, in part, by U channel 28. Second front surface 36 may be planar with or may be nonplanar with respect to first front surface 42. Sidewalls 30 may further define lip feature 32 configured to interface, at least in part, with U channel face 34. Lip 32 may at least partially stabilize connector plate 24 from undesirable movement (e.g., horizontal movement) when engaged with U channel 28 and/or assist with aligning connector plate 24 into U channel 28. Connector plate 24 may define notch 38 which may be configured to engage with detent 40 of patch panel element 12. For example, connector plate 24 may include notch 38 positioned in close proximity to sidewalls 30 and configured to at least partially engage with detent 40. In particular, notch 38 may at least partially engage with detent 40 when patch panel element 12 is substantially positioned within U channel 28. At least partial engagement of notch 38 with detent 40 may aid in retaining connector plate 24 within U channel 28, thereby ensuring connector plate 24 remains in contact with U channel 28.

In some embodiments, connector plate 24 may define at least one opening configured to releasably engage with at least one connector 102. Connector plate 24 may define a plurality of openings, each configured to releasably engage with at least one connector 102. For example, connector plate 24 may define six linearly aligned openings, each configured to releasably engage with at least one connector. However, more or less linearly aligned openings may be incorporated without departing from the spirit/scope of this disclosure. In fact, the number of openings may be determined based on the desired form factor of connector plate 24. Connector plate 24 may further include at least one additional row of linearly aligned openings. The at least one additional row of linearly aligned openings may be aligned with, offset from or partially aligned with and partially offset from the first row of linearly aligned openings.

Figure 1B:
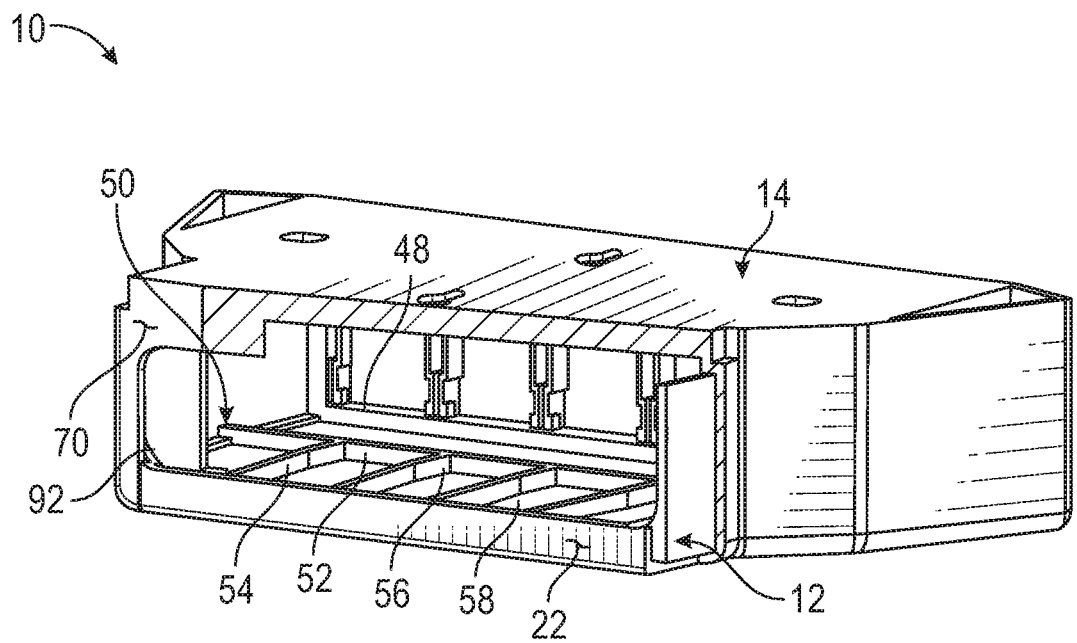
FIG. 1B schematically depicts a section perspective view of a modular patch panel assembly according to this disclosure.
Figure 2A:
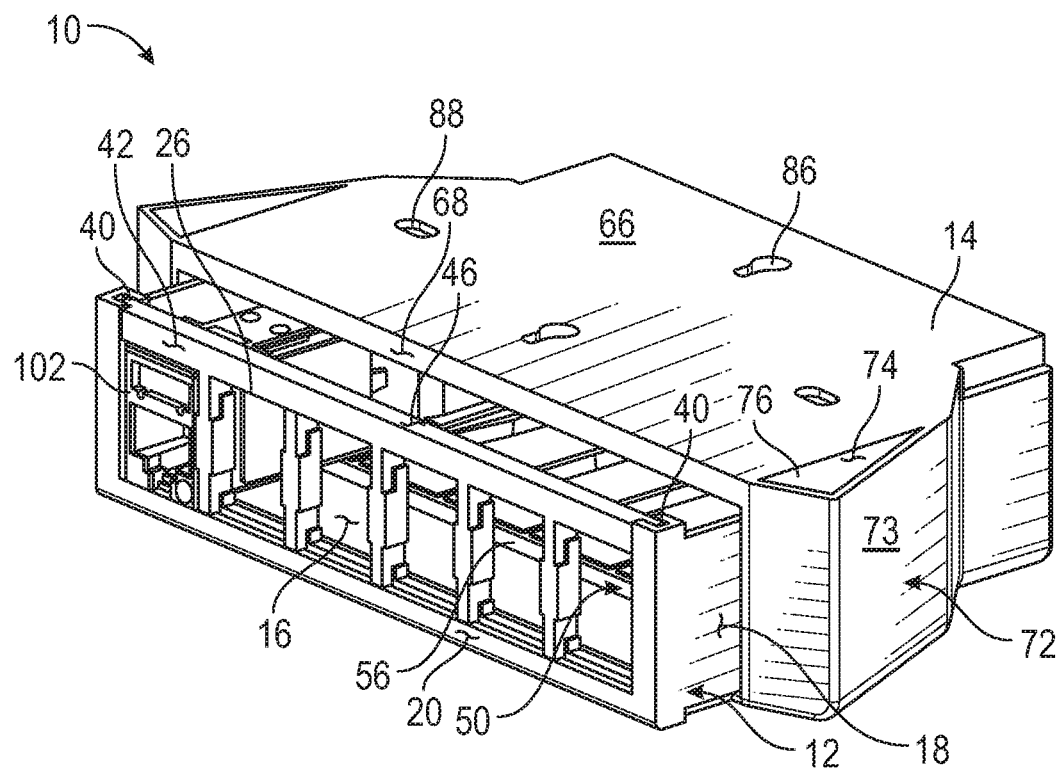
FIG. 2A schematically depicts a top perspective view of an unassembled modular patch panel assembly including a patch panel element and a base, according to this disclosure.
Figure 2B:
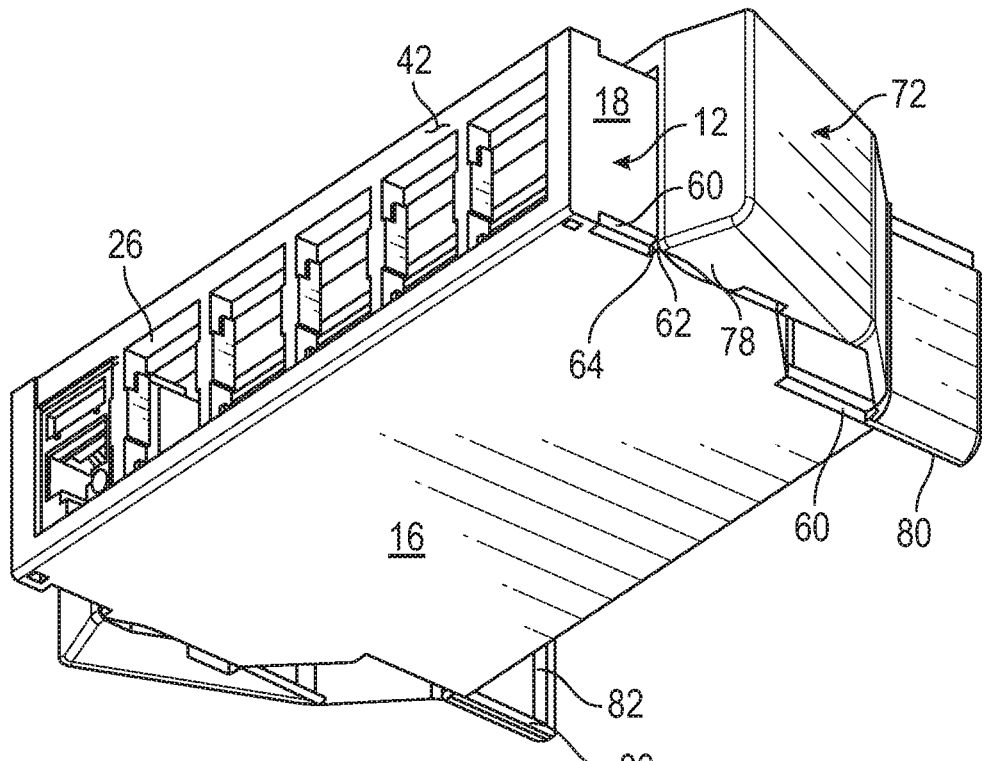
FIG. 2B schematically depicts a bottom perspective view of an unassembled modular patch panel assembly including a patch panel element and a base, according to this disclosure.
Figure 2C:
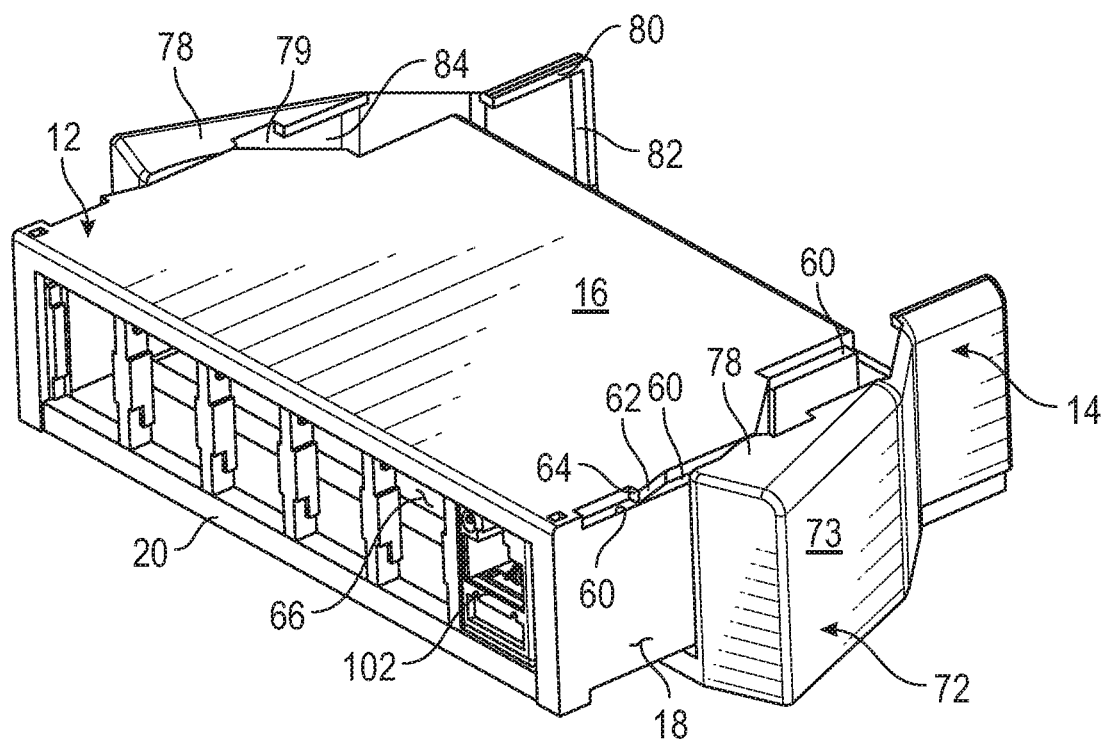
FIG. 2C schematically depicts a top perspective view of the bottom of an unassembled modular patch panel assembly including a patch panel element and a base, according to this disclosure.
Figure 3A:
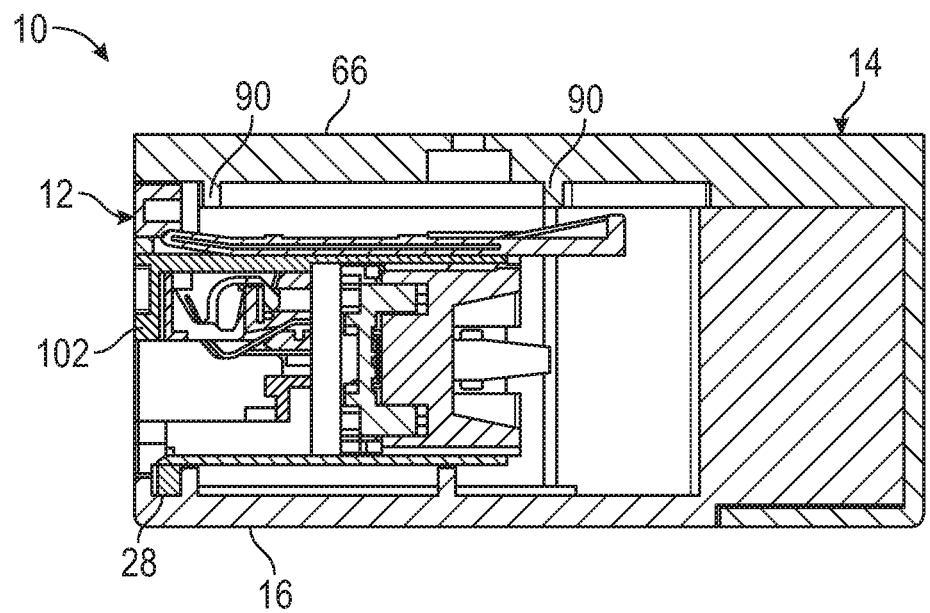
FIG. 3A schematically depicts a side section view of an assembled modular patch panel assembly according to this disclosure.
Figure 3B:
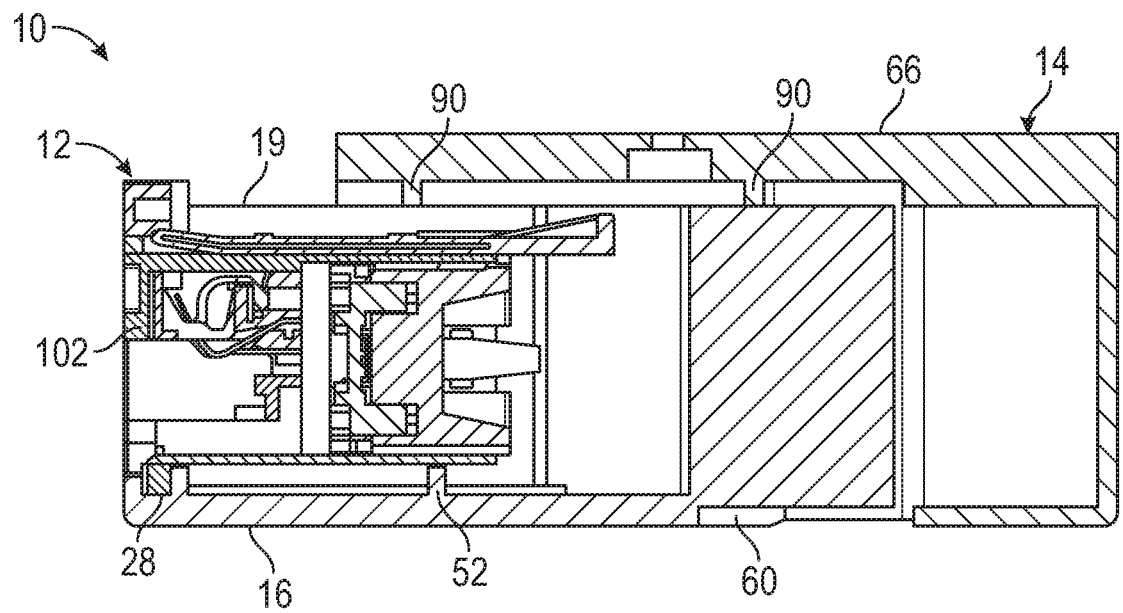
FIG. 3B schematically depicts a side section view of an unassembled modular patch panel assembly including a patch panel element and a base, according to this disclosure.

Patch panel element 12 may further include one or more features/elements for managing cables/connectors (see FIG. 1B). For example, patch panel element 12 may include cable management features 50 positioned with respect to the interior of first surface 16. Cable management features 50 may protrude from the interior of first surface 16 in the direction of top surface 46 of connector plate 24. Cable management features 50 may include at least one protrusion 52, 54 defining an upper surface 56. Upper surface 56 may at least partially engage with one or more of connector 102 and cable (not shown). In some instances, cable management features 50 may include protrusion 52 positioned substantially parallel with respect to connector plate 24 and protrusion 54 positioned substantially perpendicular with respect to protrusion 52. Upper surface 56 may be planar with one or more of surface 48 of patch panel element 12 and bottom surface 44 of connector plate 24. However, upper surface 56 may be nonplanar with respect to surface 48 and bottom surface 44. In some instances, protrusions 52, 54 may define at least one void 58 that correspond to (e.g., dimensionally correspond to) at least one opening 26. At least one void 58 may be configured to interface with one or more of connector 102 and cable (not shown). At least one void 58 may extend at least partially between front face 20 and back face 22 of patch panel element 12.

As depicted in FIGS. 1A-4 and as mentioned above, modular patch panel 10 may include patch panel element 12 and base 14. Patch panel element 12 may be configured to movably engage with base 14. Patch panel element 12 may be configured releasably engage with base 12 (e.g., semi-permanent engagement). Base 14 may be configured to directly/indirectly engage with at least one surface of the disclosed ceiling, furniture or wall. Base 14 may be first mounted directly/indirectly with respect to at least one surface of the disclosed ceiling, furniture or wall and patch panel element 12 may be secondly mounted with respect to base 14. However, it should be appreciated that patch panel element 12 may be mounted with respect to base 14 at the same time as or before mounting base 12 directly/indirectly with respect to at least one surface of the disclosed ceiling, furniture or wall.

Base 14 may define second surface 66 (e.g., top or bottom surface) and at least one sidewall 84, which, in part, define an interior and an exterior. In some instances, base 14 may include second surface 66 and two oppositely positioned sidewalls 84 extending therefrom. Two oppositely positioned sidewalls 84 may be substantially parallel, in part, and may be angled, in part, with respect to each other so as to correspond to sidewalls 18 of patch panel element 12. Base 14 may further include oppositely positioned front face 68 and back face 70 extending from second surface 66 and angularly positioned with respect to sidewalls 84, such as perpendicular to or substantially perpendicular to sidewalls 84. Thus, second surface 66, sidewalls 84, front face 68 and back face 70 may, in whole or in part, define an interior and an exterior. Sidewalls 84 may be configured to, in part, releasably engage with patch panel element 12. Base 14 may further define one or more features configured to at least partially engage with patch panel element 12. Base 14 may define a substantially U shaped interior in view from front face 68.

In an exemplary embodiment, base 14 may be configured to slidably engage with patch panel element 12 so as to form, in part, modular patch panel 10 having two exposed surfaces 16, 66. (See FIGS. 3A and 3B). Sidewall 18 and/or sidewall edge 19 of patch panel element 12 may at least partially interface with base 14. For example, sidewall 18 of patch panel element 12 may be in at least partial contact with sidewall 84 of base 14 and/or sidewall edge 19 of patch panel element 12 may be in at least partial contact with protrusion 90 extending from interior surface of second surface 66 of base 14.

Further, patch panel element 12 and base 14 may interface with one or more releasable locking features 62, 79. (see FIGS. 2B and 2C). Locking features 62, 79 may be correspondingly configured to engage so as to semi-permanently lock patch panel element 12 and base 14 together. The "locking" may occur during slidable engagement between patch panel element 12 and base 14. For example, patch panel element 12 may define channel 60 which is associated with at least one of first surface 16 and sidewall 18 and may extend at least partially between front face 20 and back face 22. Channel 60 may be associated with a portion of first surface 16 and a portion of sidewall 18 and may define a substantially L shaped channel. L shaped channel 60 may further define locking feature 62 (e.g., detent) which protrudes from a surface of L shaped channel 60 so as to define engagement surface 64. Base 14 may define a corresponding channel including feature 78, configured to travel in close proximity to L shaped channel 60 during slidable engagement of patch panel element 12 and base 14, and locking feature 79, configured to restrict, in part, movement of locking feature 62. Corresponding channel, feature 78 and locking feature 79 may be associated with protuberance 72. Upon engagement of locking feature 62 in locking feature 79, patch panel element 12 is semi-permanently "engaged" with respect to base 14 so as to minimize (or eliminate) slidable movement. Additionally, L shaped channel 60, in close proximity to back face 22, may engage with corresponding features 80, 82 of base 14. Features 80, 82 may be substantially perpendicular with respect to each other so as to provide a backstop for patch panel element 12. Upon engagement of patch panel element 12 and base 14, back face 22 of patch panel element 12 and back face 70 of base 14 may define void 92. Void 92 may be configured to allow at least one cable to pass through from interior of modular patch panel 10 to the exterior.

Removal of patch panel element 12 from base 14 may be accomplished by a plurality of methods. In one example, protuberance 72 of base 14, associated, in part, with sidewall 84, may be at least partially flexible so as to enable disengagement of locking features 62, 79. Protuberance 72 may include cavity 76, which may be defined, in part, by outer surface 73 and inner surface 74. Inner surface 74 may be substantially parallel to sidewall 84, however, inner surface 74 may be angled with respect to sidewall 84 without departing from the spirit/scope of this disclosure. Outer surface 73 may be angled with respect to sidewall 84. Protuberance 72 may extend from second surface 66 thereby defining a substantially U shaped cavity, configured for, in part, receipt of patch panel element 12. Protuberance 72 may be configured to move relative to second surface 66 (e.g., rotational movement with respect to second surface 66). Protuberance 72 may be configured to move relative to patch panel element 12 so as to promote disengagement of locking features 62, 79. Cavity 76 may facilitate, in part, movement of protuberance 72 without severely impacting the structural integrity of protuberance 72 and/or base 14. Cavity 76 may promote flexing of protuberance 72 to sufficiently disengage locking features 62, 79. Upon disengagement of locking features 62, 79, patch panel element 12 may be slidably removed from base 14. It is appreciated that during slidable engagement of patch panel element 12 with base 14 protuberance 72 may outwardly flex relative to second surface 66 as locking feature 62 travels past feature 78.

Modular patch panel 10 may be configured to directly/indirectly engage with at least one surface of the disclosed ceiling, furniture or wall. Modular patch panel 10 may be configured to be releasably engaged with at least one surface of the disclosed ceiling, furniture or wall. In some embodiments, base 14 may be configured to interface with at least one surface of the disclosed ceiling, furniture or wall. For example, feature 86 and/or 88 may be configured to directly/indirectly engage with at least one surface of the disclosed ceiling, furniture or wall. In some embodiments, one or more fasteners (e.g., screw) may traverse feature 86, 88 so as to engage modular patch panel 10 to at least one surface of the disclosed ceiling, furniture or wall. Engagement of modular patch panel 10 to at least one surface of the disclosed ceiling, furniture or wall may be semi-permanent (or permanent). It should be appreciated, however, that other mounting methods may be utilized without departing from the spirit/scope of this disclosure.

In a non-limiting example, patch panel element 12 and base 14 may be fabricated from a material selected from the group including, plastic (e.g., Ultem® 1010 PEI, ABS PA 765A, Teflon™) and metal (steel, aluminum). In some instances, patch panel element 12 and base 14 may be fabricated from the same material and in other instances, from different materials. Modular patch panel 10 may be fabricated so as to be UL® Plenum Rated.

As depicted in FIGS. 5A-8B, assembly 200 includes modular patch panel 10 configured to at least partially engage with plate 202. Plate 202 may be configured to interact with the disclosed ceiling, furniture or wall. Engagement of plate 202 with the disclosed ceiling, furniture or wall may be accomplished using, at least one of fastener(s) (e.g., screws, bolts, pins), adhesive (e.g., tape, glue), hook and loop fastener. Plate 202 may be fabricated from a material selected from the group including, plastic (e.g., Ultem 1010 PEI, ABS PA 765A, Teflon) and metal (steel, aluminum). Plate 202 may be configured to engage with at least one modular patch panel 10.

Plate 202 may be configured to engage with a plurality of modular patch panels 10. For example and as depicted, two modular patch panels 10 may be associated with plate 202. Modular patch panels 10 may be angularly positioned such that first front surface 42 of the first modular patch panel 10 is nonplanar with first front surface 42 of the second modular patch panel 10. First modular patch panel 10 may be positioned such that outer surface 73 of protuberance 72 is in close proximity to outer surface 73 of second modular patch panel 10. A plurality of plate assemblies 200 may be angularly positioned relative to each other. In a non-limiting example, four plates 202 including two modular patch panels 10 each may be angularly positioned relative to each other so as to assemble eight modular patch panels 10 in close proximity thereto. Thus, in instances where each modular patch panel 10 includes six openings 26 for receipt of at least one connector 102, the disclosed four plate assembly may be configured for receipt of at least forty-eight connectors.

Plate 202 may include engagement features 212 which extend from surface 204 and may be configured to at least partially engage with surface 66 of base 14. Particularly, engagement features 212 may define a substantially T shaped cross-section that is configured to engage with feature 86 of base 14. Plate 202 may include a plurality of T shaped engagement features 212. Feature 86 of modular patch panel 10 may be configured to engage with T shaped engagement feature 212 at a first position. Modular patch panel 10 may be moved from the first position to a second position so as to engage plate 202 with modular patch panel 10 in a releasably locked configuration. (See FIGS. 8A and 8B). Plate 202 may further include latch 208 having an engagement feature 210 configured to engage with modular patch panel 10 so as to restrict slidable movement of modular patch panel 10 when positioned at the second position. Latch 208 may be disengaged so as to facilitate movement pf modular patch panel 10 from the second position to the first position. Subsequent modular patch panels 10 may be assembled/removed as set forth above.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A modular patch panel assembly comprising:
   a. a first patch panel element including:
      i. a first surface defining a top or bottom surface of the first patch panel element, and two opposing sidewalls including an interior surface and an exterior surface, and
      ii. at least one opening configured to receive at least one connector;
   b. a first base including:
      i. a second surface defining a top surface or a bottom surface of the first base, and two opposing sidewalls including an interior surface and an exterior surface, and
      ii. a protuberance extending outwardly from each of the sidewalls and including an engagement feature,
   wherein the first patch panel element is releasably engaged with the engagement features of the protuberances to form a first modular patch panel assembly; and
   wherein in the releasably engaged configuration, the first surface of the first patch panel element defines a top or bottom exposed surface of the first modular patch panel assembly, and the second surface of the first base defines an opposing top or bottom exposed surface of the first modular patch panel assembly.

2. The modular patch panel of claim 1, wherein the patch panel element is slidably engaged with the base.

3. The modular patch panel of claim 1, wherein the patch panel element is configured to receive six linearly aligned connectors.

4. The modular patch panel of claim 1, wherein the protuberances are partially angled with respect to each other.

5. The modular patch panel of claim 1, further comprising a plate configured to engage with at least two modular patch panel assemblies.

6. The modular patch panel of claim 5, wherein the protuberance of the first modular patch panel assembly is configured to be mounted in close proximity with the protuberance of an adjacent modular patch panel assembly.

7. The modular patch panel of claim 1, wherein the two opposing side walls of the patch panel element are substantially parallel in part.

8. The modular patch panel of claim 1, wherein the two opposing side walls of the patch panel element are angled relative to each other at least in part.

9. The modular patch panel of claim 1, wherein the two opposing side walls of the patch panel element include features that releasably engage the base.

10. The modular patch panel of claim 1, wherein the patch panel element directly or indirectly interfaces with at least one of a connector and a cable.

11. The modular patch panel of claim 1, wherein the patch panel element includes one or more releasable locking features that function to semi-permanently lock the patch panel element relative to the base.

12. The modular patch panel of claim 11, wherein the one or more releasable locking features includes an L-shaped channel that includes a detent associated with the exterior of the patch panel element.

13. The modular patch panel of claim 1, wherein the patch panel element is fabricated from a material selected from the group consisting of a plastic and a metal.

14. The modular patch panel of claim 1, wherein the base is fabricated from a material selected from the group consisting of a plastic and a metal.

15. The modular patch panel of claim 1, wherein the patch panel element and the base are fabricated from the same material.

16. The modular patch panel of claim 1, wherein the protuberances extend from the second surface of the first base and are configured to rotationally move or flex relative to the second surface to disengage the first patch panel element from the first base.

17. A modular patch panel system, comprising:
   a first modular patch panel assembly including:
      (i) a first patch panel element including (a) a first surface defining a top or bottom surface of the first patch panel element, and two opposing sidewalls including an interior surface and an exterior surface, and (b) at least one opening configured to receive at least one connector; and
      (ii) a first base including (a) a second surface defining a top surface or a bottom surface of the first base, and two opposing sidewalls including an interior surface and an exterior surface, and (b) a protuberance extending outwardly from each of the sidewalls and including an engagement feature;
         wherein the first patch panel element is releasably engaged with the engagement features of the protuberances of the first base to form the first modular patch panel assembly;
   a second modular patch panel assembly including:
      (i) a second patch panel element including (a) a first surface defining a top or bottom surface of the second patch panel element, and two opposing sidewalls including an interior surface and an exterior surface, and (b) at least one opening configured to receive at least one connector; and (ii) a second base including (a) a second surface defining a top surface or a bottom surface of the first base, and two opposing sidewalls including an interior surface and an exterior surface, and (b) a protuberance extending outwardly from each of the sidewalls and including an engagement feature;
wherein the second patch panel element is releasably engaged with the engagement features of the protuberances of the second base to form the second modular patch panel assembly; and a plate;

wherein in the releasably engaged configuration, the first surface of the first patch panel element and the first surface of the second patch panel element each define a top or bottom exposed surface of the respective first and second modular patch panel assemblies, and the second surface of the first base and the second surface of the second base each define an opposing top or bottom exposed surface of the respective first and second modular patch panel assemblies; and wherein the first base of the first modular patch panel assembly and the second base of the second modular patch panel assembly are configured to releasably engage with the plate.

18. The modular patch panel system of claim 17, wherein the protuberance of the first modular patch panel assembly is configured to be mounted in close proximity with the protuberance of the adjacent second modular patch panel assembly.

19. The modular patch panel system of claim 17, wherein the first and second modular patch panel assemblies are angularly positioned relative to each other such that a front surface of the first modular patch panel assembly is nonplanar with a front surface of the second modular patch panel assembly.

* * * * *